US011994443B2

(12) United States Patent
Huo et al.

(10) Patent No.: US 11,994,443 B2
(45) Date of Patent: May 28, 2024

(54) SENSING DEVICE WITH GAUGE (71) Applicant: Sensata Technologies, Inc., Attleboro, MA (US)

(72) Inventors: Shihong Huo, Bedford, MA (US); Lei Liu, Walpole, MA (US); David P. Hatch, Monson, MA (US); Frank H. Jacobs, Broekland (NL)

(73) Assignee: SENSATA TECHNOLOGIES, INC., Attleboro, MA (US)

( * ) Notice: Subject to any disclaimer, the term of this patent is extended or adjusted under 35 U.S.C. 154(b) by 7 days.

(21) Appl. No.: 17/703,105

(22) Filed: Mar. 24, 2022

(65) Prior Publication Data
US 2023/0304882 A1    Sep. 28, 2023

(51) Int. Cl.
*G01L 9/04*    (2006.01)
(52) U.S. Cl.
CPC ..................... *G01L 9/04* (2013.01)
(58) Field of Classification Search
CPC .................. G01L 9/04; B60K 28/00
USPC .............................................. 73/1.15
See application file for complete search history.

(56) References Cited

U.S. PATENT DOCUMENTS

| | | | |
|---|---|---|---|
| 7,555,944 B2 * | 7/2009 | Nakano | G01C 9/00 73/204.26 |
| 9,714,876 B2 | 7/2017 | Huo et al. | |
| 2005/0023065 A1 * | 2/2005 | McBride | B60R 21/0152 180/273 |
| 2009/0120194 A1 * | 5/2009 | Rahn | G01L 9/0047 73/715 |
| 2015/0128713 A1 * | 5/2015 | Kakoiyama | G01L 9/0052 73/721 |
| 2016/0265999 A1 * | 9/2016 | Van Der Wiel | G01L 19/04 |
| 2018/0010976 A1 * | 1/2018 | Seto | G01L 9/0052 |
| 2020/0227408 A1 * | 7/2020 | Szelong | H01L 27/0802 |

FOREIGN PATENT DOCUMENTS

EP    3236226 A1    10/2017

OTHER PUBLICATIONS

Extended European Search Report issued in related Application Serial No. 23164185.3 dated Aug. 21, 2023.

* cited by examiner

*Primary Examiner* — Nathaniel T Woodward
(74) *Attorney, Agent, or Firm* — Mark H. Whittenberger; Holland & Knight LLP (57) ABSTRACT

Embodiments included herein are directed towards sensing devices and related methods. Embodiments may include a first gauge positioned on a port of the sensing device. A first resistor of the first gauge may be positioned in a first compression region of the port. A second resistor of the first gauge may also be positioned in the first compression region of the port.

18 Claims, 11 Drawing Sheets

SENSING DEVICE WITH GAUGE

BACKGROUND

Sensing devices may be used to measure environmental conditions. For example, a pressure sensing device may be used in an industrial application to monitor and electrically convey pressure conditions. A pressure sensing device may include multiple components. For example, a pressure sensing device may include a metal base component and a shell to house pressure sensor electronics and a sense element. The pressure sensor electronics may be configured to receive a signal transmitted from the sense element (e.g., a resistive sense element). The sense element may detect a pressure of a fluid received through a conduit of the metal base component and the signal transmitted from the sense element to the pressure sensor electronics may vary depending on the sensed pressure of the fluid. A sense element may also detect force conditions. The pressure sensing device may further include a connector component electrically coupled to the pressure sensor electronics.

Pressure sensors devices may offer various measuring ranges and may be designed for use in general industrial applications having high pressure ranges. For example, some pressure sensors devices may be designed for high proof pressures, may be used in a variety of applications, including, but not limited to, hydraulics and pneumatics, air conditioning and refrigeration, mobile hydraulics and heavy vehicle and off-road (HVOR) applications, plant engineering and automation, pumps and compressors, etc., and/or may detect break force, weight, etc.

SUMMARY OF THE DISCLOSURE

As will be discussed in greater detail below, embodiments of the present disclosure are directed towards sensing devices and related methods. Embodiments of sensing devices may include a first gauge positioned on a port of the sensing device. A first resistor of the first gauge may be positioned in a first compression region of the port. A second resistor of the first gauge may also be positioned in the first compression region of the port.

Some or all of the following features may be included. The first resistor may be positioned approximately orthogonal to the second resistor. The first gauge may be substantially L-shaped. The first gauge may be a first L-shaped gauge and the first resistor may be positioned on a first leg of the first L-shaped gauge. The second resistor may be positioned on a second leg of the first L-shaped gauge. The first gauge may be positioned outside of a center region of the port. The first gauge may also be positioned outside of a tension region of the port. The first resistor and the second resistor may be part of a Wheatstone bridge configuration. The port may be a stainless steel port that may be glass bonded to the first gauge. A glass bond corresponding to the first gauge may be positioned outside of a center region of the port. The first compression region may be a region that indicates a negative radial strain under an applied pressure or an applied force. A second gauge may positioned on the port of the sensing device. A third resistor of the second gauge may be positioned in a second compression region of the port. A fourth resistor of the second gauge may be positioned in the second compression region of the port. The second gauge may be a second L-shaped gauge and the third resistor may be positioned on a third leg of the second L-shaped gauge. The fourth resistor may be positioned on a fourth leg of the second L-shaped gauge. The second gauge may be positioned outside of a center region of the port. The second gauge may be positioned outside of a tension region of the port. At least one of the first compression region and the second compression region may be a radial strain compression region. Numerous other features are also within the scope of the present disclosure.

In an embodiment, a method may include positioning a first resistor of a first gauge in a first compression region of a port of a sensing device. The method may further include positioning a second resistor of the first gauge in the first compression region of the port of the sensing device. The second resistor may be positioned approximately orthogonal to the first resistor. The first gauge may be positioned outside of a center region of the port and outside of a tension region of the port.

Some or all of the following features may be included. The method may include reducing a first temperature gradient along the first gauge by positioning the second resistor approximately orthogonal to the first resistor. The method may further include positioning a third resistor of a second gauge in a second compression region of the port of the sensing device. The method may also include positioning a fourth resistor of the second gauge in the second compression region of the port of the sensing device, the fourth resistor positioned approximately orthogonal to the third resistor. The second gauge may be positioned outside of the center region of the port and outside of a tension region of the port. Additionally, the method may include reducing a second radial temperature gradient along the second gauge by positioning the third resistor approximately orthogonal to the fourth resistor. At least one of the first compression region and the second compression region may be a radial strain compression region and the tension region may be a radial strain tension region. Numerous other operations are also within the scope of the present disclosure.

In an embodiment, a sensing device may include a first L-shaped gauge positioned on a port of the sensing device. A first resistor may be positioned on a first leg of the first L-shaped gauge. The first resistor may also be positioned in a first radial strain compression region of the port. A second resistor may be positioned on a second leg of the first L-shaped gauge. The second resistor may also be positioned in the first radial strain compression region of the port. A second L-shaped gauge may be positioned on the port of the sensing device. A third resistor may be positioned on a third leg of the second L-shaped gauge. The third resistor may also be positioned in a second radial strains compression region of the port. A fourth resistor may be positioned on a fourth leg of the second L-shaped gauge. The fourth resistor may also be positioned in the second radial strain compression region of the port.

Some or all of the following features may be included. The first L-shaped gauge and the second L-shaped gauge may be positioned outside of at least one of a center region of the port and a tension region of the port. Numerous other features are also within the scope of the present disclosure.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

This summary is provided to introduce a selection of concepts that are further described below in the detailed description. This summary is not intended to identify essential features of the claimed subject matter, nor is it intended to be used as an aid in limiting the scope of the claimed subject matter.

BRIEF DESCRIPTION OF THE DRAWINGS

Embodiments of the present disclosure are described with reference to the following figures.

Like reference symbols in the various drawings may indicate like elements.

DETAILED DESCRIPTION

The discussion below is directed to certain implementations. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the embodiments and/or implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

Sensing devices may be pressure sensors well-suited for industrial or automotive applications, or in heating, ventilation, and air conditioning (HVAC) systems. For example, sensors devices may be used to detect coolant pressure, oil or fuel pressure, hydraulic pressure, and other fluid and gas pressures. Sensing devices may also be force sensors for measuring any kind of force or weight that may cause radial and/or tangential strain (e.g., as discussed in connection with the curves shown in FIG. 4 and FIG. 6). For example, the sensing device may sense a brake force for an electric, diesel, or gasoline vehicle.

Figure 1A:
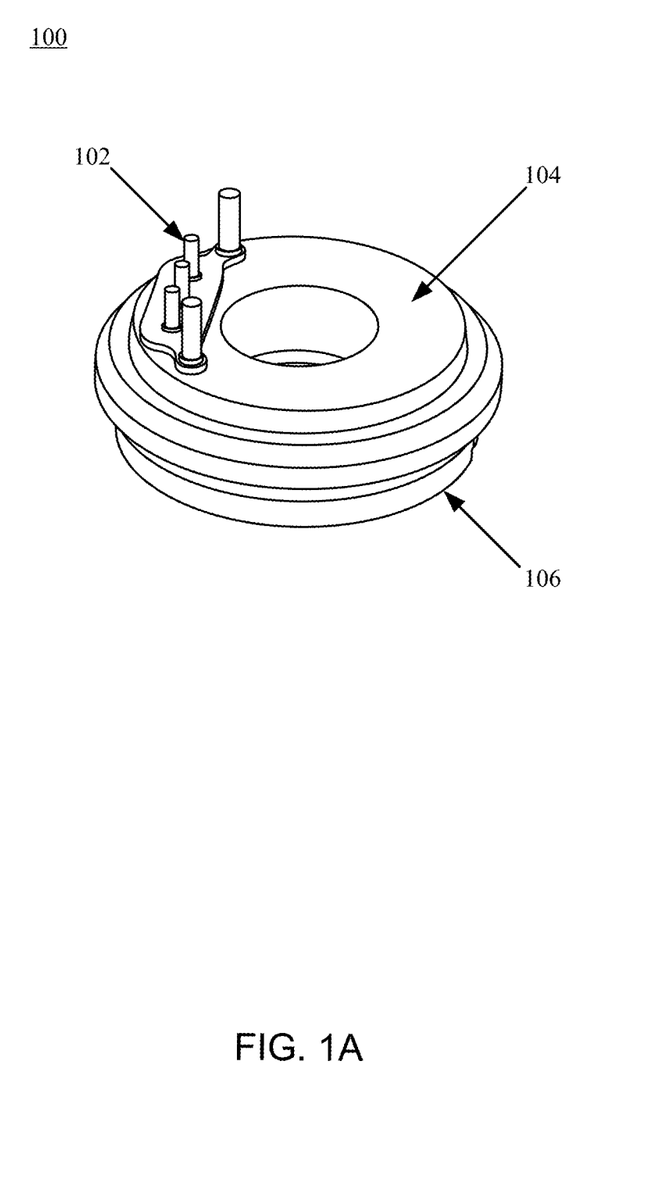
FIG. 1A is a diagram illustrating an isometric view of an assembled sensing device according to embodiments of the present disclosure.
Figure 1B:
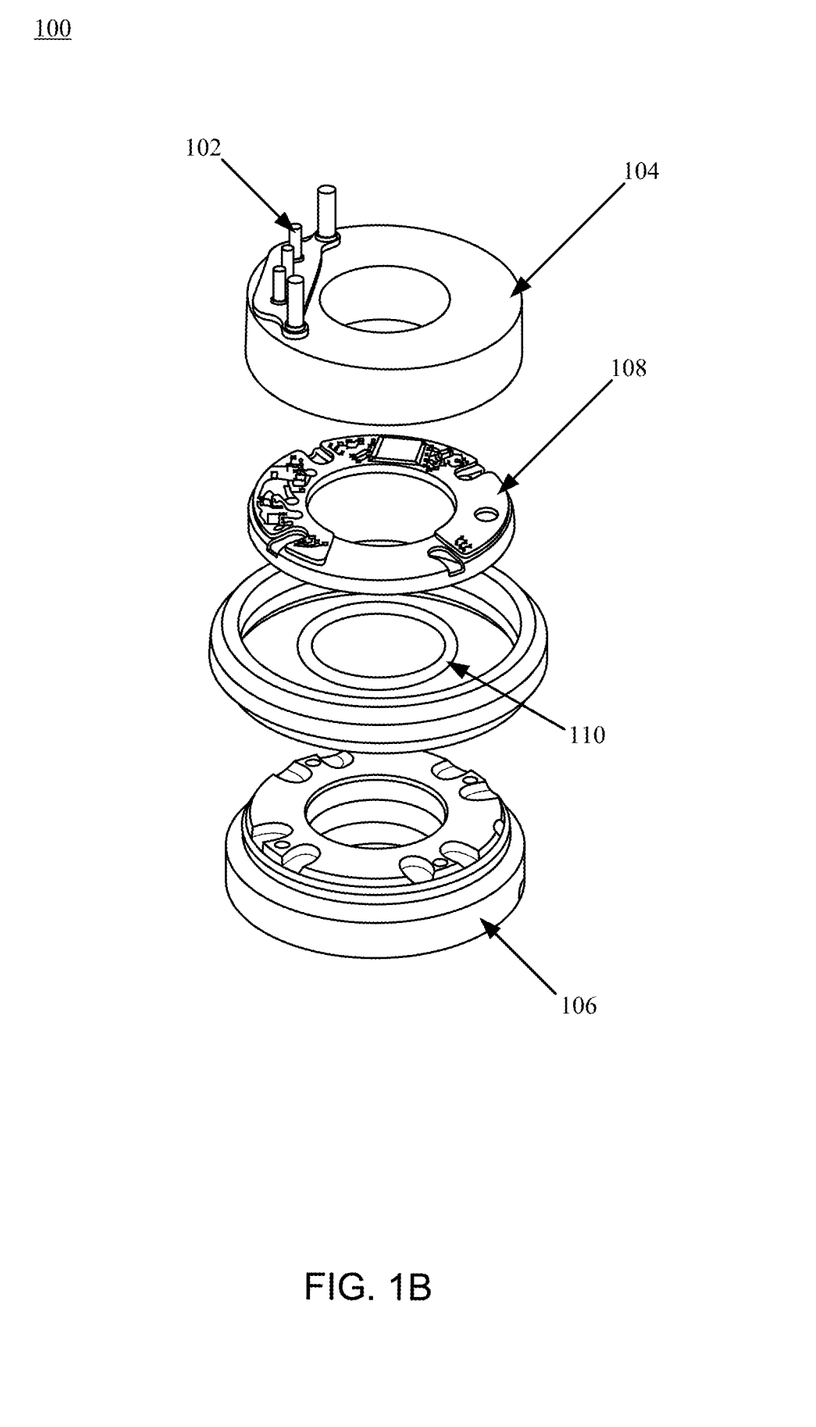
FIG. 1B is a diagram illustrating an exploded isometric view of the sensing device of FIG. 1A (prior to assembly)

Referring to FIG. 1A, an isometric view of an assembled sensing device according to embodiments of the present disclosure is shown. In some embodiments, a sensing device 100 may be an electro-mechanical brake (EMB) force sensor and may include one or more connectors (e.g., connector 102) coupled to a tubular housing (e.g., metal housing 104). The housing may be seated on a SEA (sensing element assembly) 106. The one or more connectors may be electrical connectors for connecting external components to electrical components included within the housing. Referring to FIG. 1B, an exploded isometric view of the sensing device 100 of FIG. 1, prior to assembly, is shown. The sensing device 100 may also include a printed circuit board (PCB) 108 and an O-ring 110.

Figure 2A:
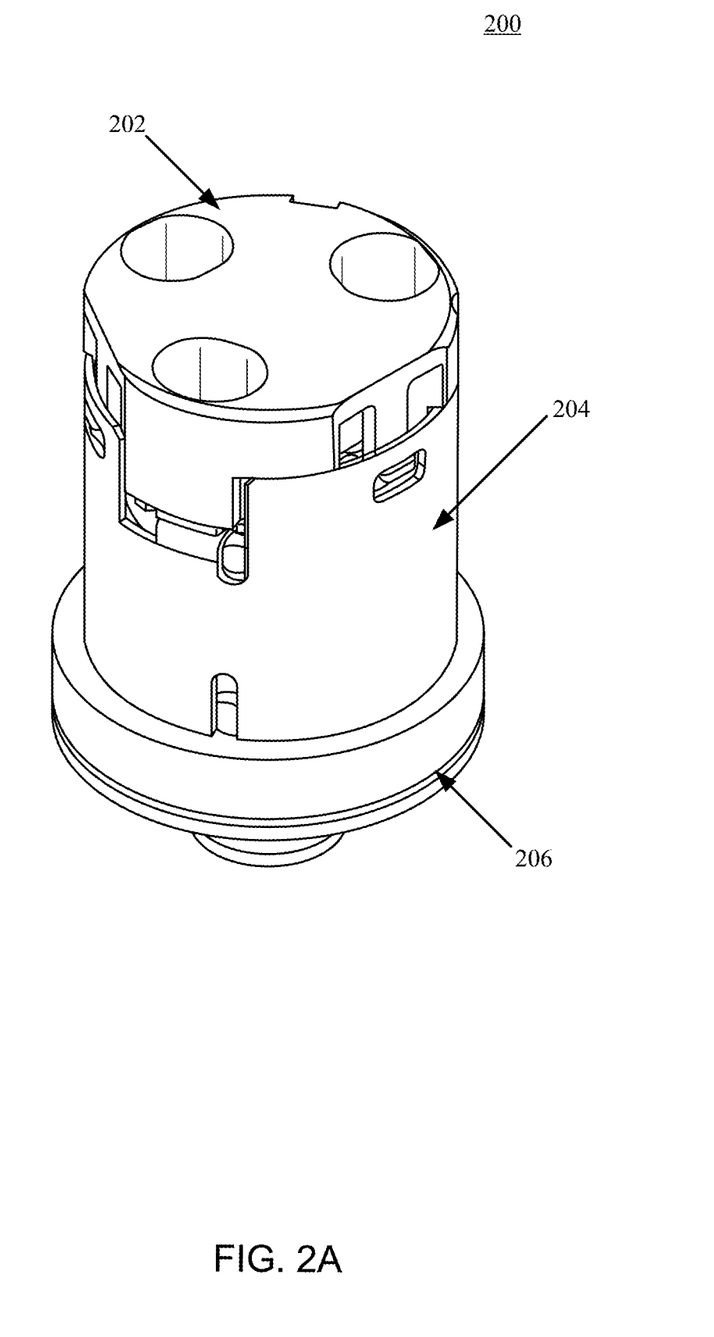
FIG. 2A is a diagram illustrating an isometric view of an assembled sensing device according to embodiments of the present disclosure.
Figure 2B:
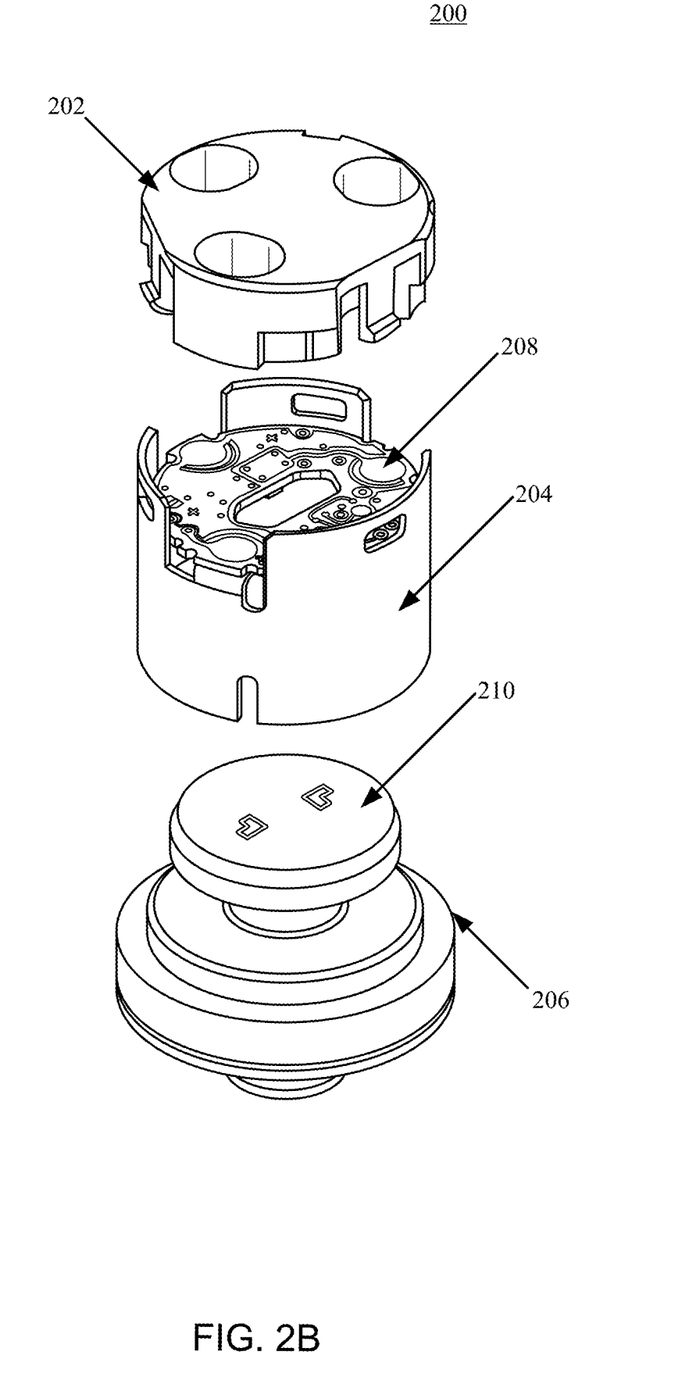
FIG. 2B is also a diagram illustrating an exploded isometric view of the sensing device of FIG. 2A (prior to assembly)

Referring to FIG. 2A, an isometric view of an assembled sensing device according to embodiments of the present disclosure is shown. In some embodiments, a sensing device 200 may be a pressure sensor and may include a connector 202 coupled to a tubular housing (e.g., metal housing 204). The housing may be seated on a SEA 106. The connector 202 may be an electrical connector for connecting external components to electrical components included within the housing. Referring to FIG. 2B, an exploded isometric view of the sensing device 200 of FIG. 2A, prior to assembly, is shown. The sensing device 200 may also include a printed circuit board (PCB) 208 and a port 210.

In some embodiments, the port 210 may also be a connector (e.g. a mechanical pressure connector) capable of connecting to a fluid channel (or for a force sensor such as an EMB force sensor, capable of receiving a pedal force) and exposing sensor components within the housing to a liquid/gas (or for a force sensor such as an EMB force sensor, capable of exposing sensor components within the housing to a mechanical force component). One or more electrical leads may transmit electrical signals from electrical components within the housing 204 to external components. The housing 304 may include a cavity and may enclose the PCB 208 and a sense element. A seal may be applied to the connector 202 and the housing 204 to hermetically seal the cavity. Electrical contacts in the PCB 208 may be configured to receive electrical leads of the connector 202. The PCB 208 may be configured to receive electrical signals from a circuit module and may relay those signals to the electrical leads of the connector. The circuit module may include circuitry configured to process, transmit, and/or store signals from the sense element. For example, the circuitry may be an application specific integrated circuit (ASIC) configured to convert signals from the sense element into data understandable by an external component. The circuit module may include a base that supports circuitry within the housing and that may be seated on the port 210. The sense element may connect to or be in communication with the PCB 208 through wire bonding. The sense element may be configured to sense the pressure of fluid within an interior channel of the port 210. For example, the sense element may include resistive sense elements designed to measure flexure of a diaphragm. The junction of the bottom of the sense element and the port 210 may be sealed to prevent fluid from flowing into the cavity of the housing. The sense element may be coupled to the circuit module, which may process, transmit, and/or store signals from the sense element. The port 210 may include a port connector that may be inserted into a fluid channel for detecting, for example, the pressure or temperature of the fluid in that channel. The port 210 may introduce fluid from the fluid channel to the sense element via an axial passage of the port 210. The port 210 may be milled out of stainless steel or created from another suitable material.

Figure 3:
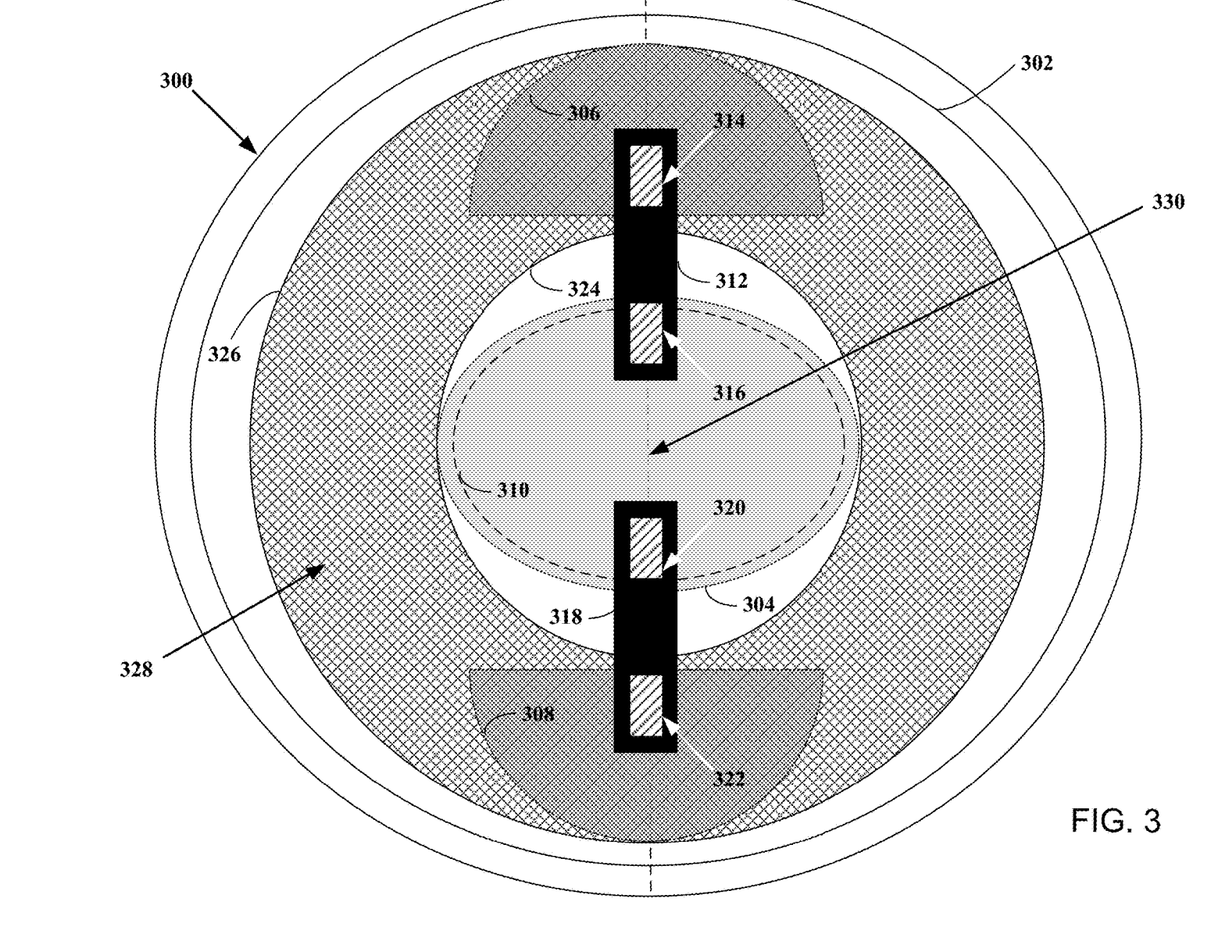
FIG. 3 illustrates an example port and gauge configuration for a sensing device in accordance with the present disclosure.

Referring to FIG. 3, a sensing device may be a pressure or force sensor that includes a stainless steel port or body (e.g., port 300) and one or more micro silicon strain gauges (e.g., gauges 312 and/or 318). The micro silicon strain gauges 312 and/or 318 may include sense elements, which may include one or more resistors (e.g., resistors 314, 316, 320, and/or 322). Ports and gauges as discussed herein may be described as stainless steel ports and micro silicon strain gauges, however various other materials may be used to create ports and gauges while still realizing the benefits of the techniques and features described in the present disclosure.

Figure 1C:
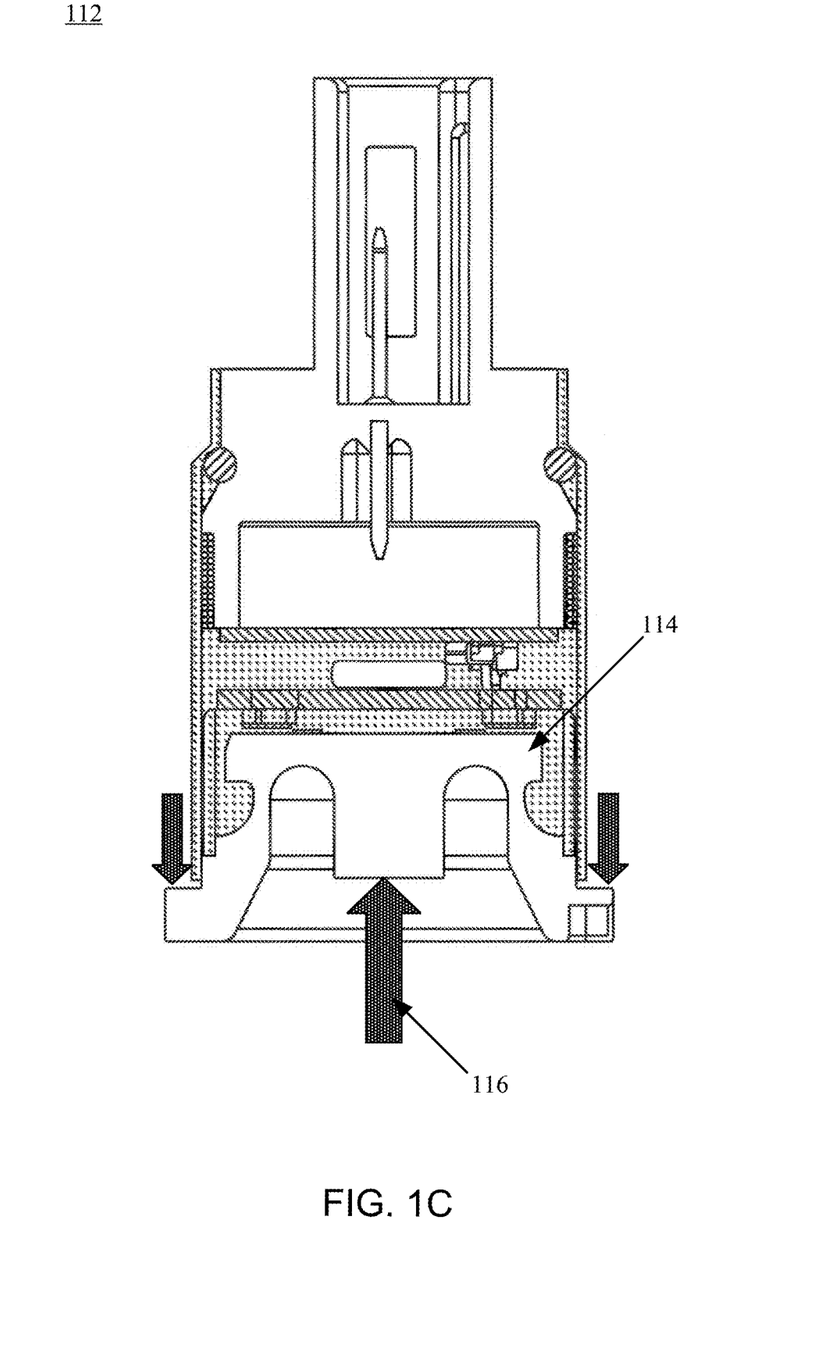
FIG. 1C is a diagram illustrating a cross-sectional view of an example force sensor in accordance with the present disclosure.
Figure 2C:
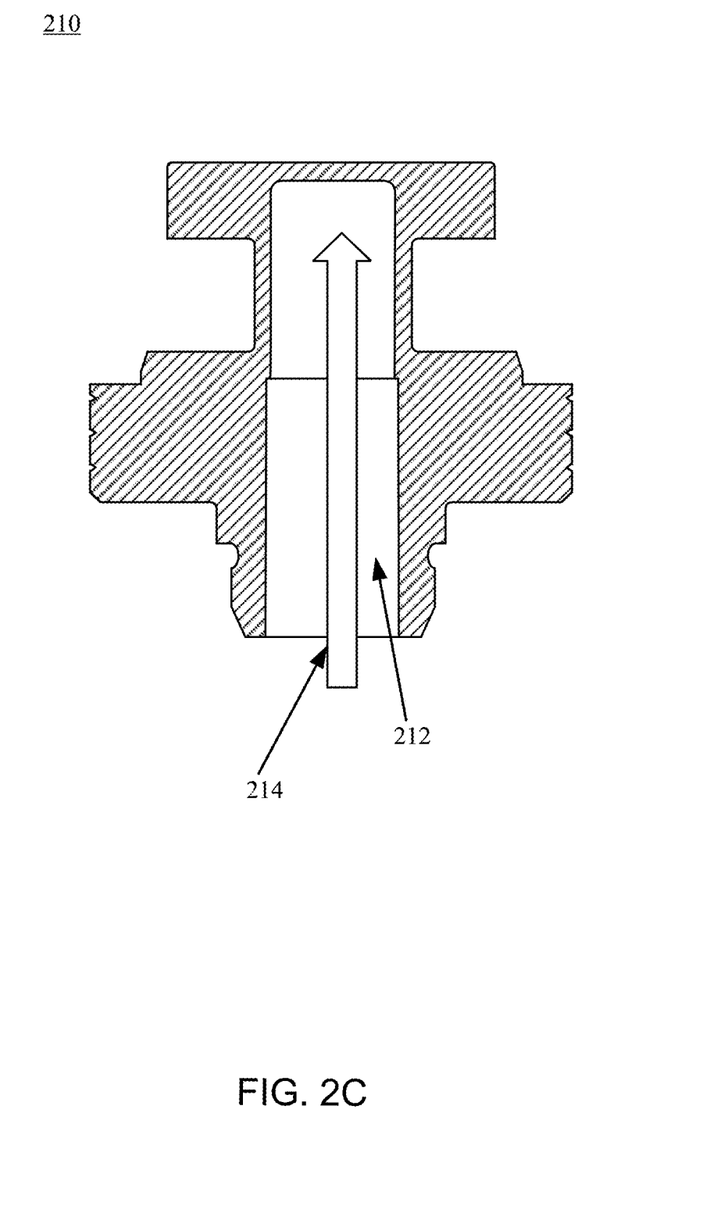
FIG. 2C is a diagram illustrating a cross-sectional view of an example port in accordance with the present disclosure.

The port 300 or body may maintain fluidic communication between an interior channel and a fluid medium or may sustain an applied force. Referring to FIG. 1C, a cross-sectional view of an example force sensor 112 in accordance with the present disclosure is shown. The force sensor may include a port or force compliant element 114 (which may receive, for example, an axial force (e.g., as indicated by arrow 116). The axial force may cause compression and/or tension regions as described herein. Referring to FIG. 2C, a diagram illustrating a cross-sectional view of an example port (e.g., port 210 of FIG. 2B) in accordance with the present disclosure is shown. The port 210 may include an interior channel 212 which may be filled by a fluid and/or gas. The fluid and/or gas may apply pressure on the port as indicated by arrow 214. The applied pressure may cause compression and/or tension regions as described herein.

For example, as fluid from a fluid medium enters and fills an interior channel of the port 300, pressure from the fluid may cause a diaphragm (e.g., diaphragm 302) to flex, or an applied force may cause the steel port or body to elastically deform. The pressure or applied force may, at least in part, cause a tension region or zone (e.g., tension region 304) and a compression region or zone (e.g., compression regions 306 and/or 308) to develop (e.g., on the diaphragm 302) of the port. The term tension region may refer to an area on the port or body experiencing a radial strain having a positive value. The term compression region may refer to an area on the port or body experiencing a radial strain having a negative value. The term "radial strain" as used herein may refer a strain along any radial line (e.g., from a center to an outer diameter) of the port or body.

A compression region area 328 (cross-filled for ease of view) may represent an area between circle 324 and circle 326 where the compression regions 306 and/or 308 may develop when the port 300 (or body) experiences pressure (or applied force). In other words, the compression region area 328 may represent space on the port 300 (or body) where the port (or body) may experience a radial strain having a negative value.

One or more of the resistors (e.g., the resistors 316 and 320) may be positioned in the tension region 304 and one or more of the resistors may be positioned in the compression region (e.g., resistor 314 in the compression region 306 and/or resistor 322 in the compression region 308). The gauges 312 and/or 318 may be glass bonded to the port 300. The pressure or applied force may cause a change in the port or diaphragm 302 which may, for example, cause the resistors 316 and 320 in the tension region 304 to elongate, which may result in an increase in resistance of the resistors 316 and 320. Further, the pressure or applied force may cause a change in the port or diaphragm 302 which may, for example, cause the resistor 314 in the compression region 306 and/or the resistor 322 in the compression region 308 to shorten or compress, which may result in a decrease in resistance of the resistors 314 and/or 322. The resistors may be implemented in a Wheatstone bridge configuration, which may be a circuit that detects or captures a resistance change, and output a corresponding voltage proportional to the pressure or applied force. For example, the Wheatstone bridge may be a bridge circuit that allows for measurement of a resistance through balance of different portions of the bridge circuit, where one portion may include the resistance to be measured.

Figure 4:
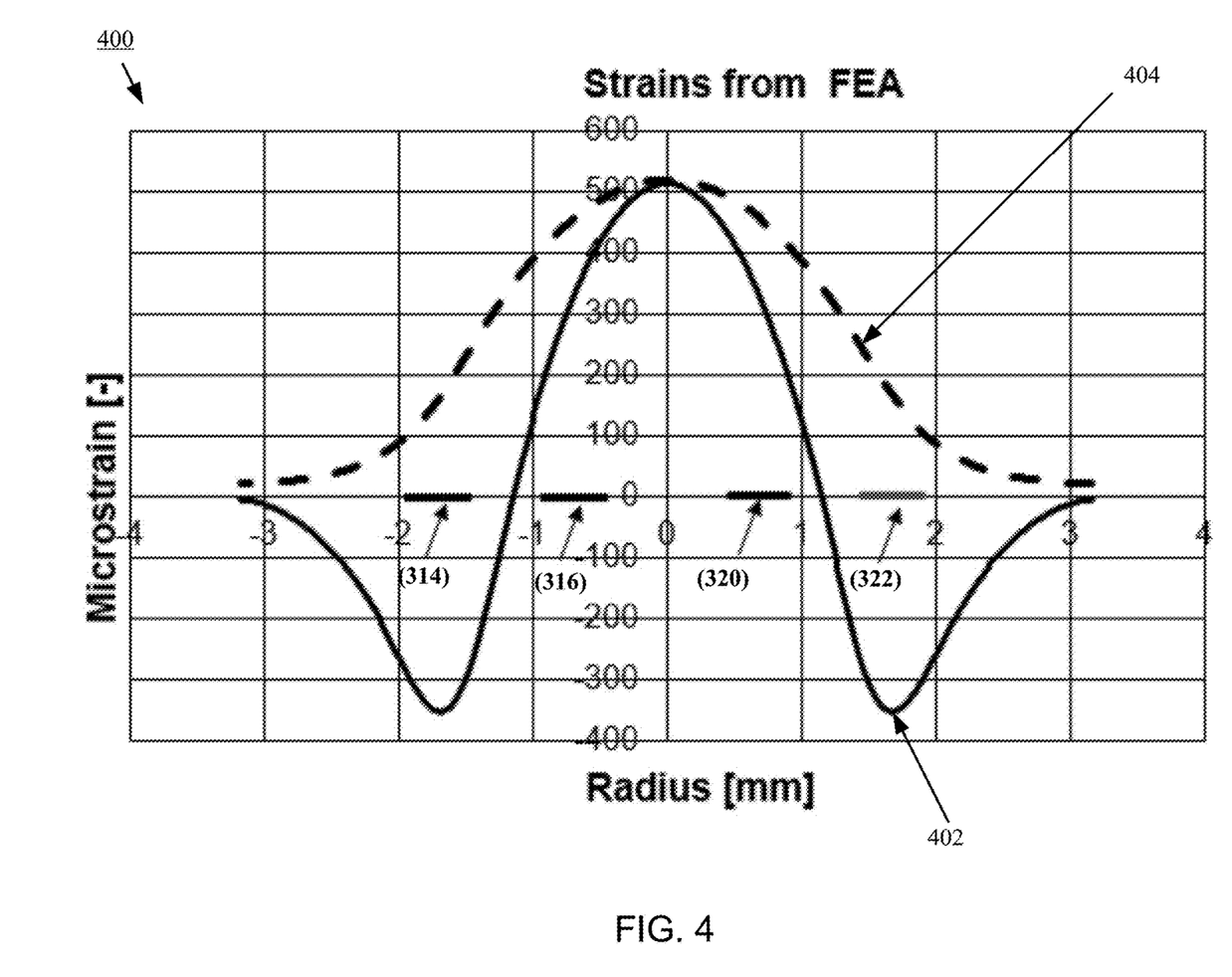
FIG. 4 shows a graph illustrating example strains measured using the port and gauge configuration of FIG. 3.

Referring to FIG. 4 a graph 400 illustrating example strains measured using the gauge configuration of FIG. 3 is shown. For example, with one resistor (e.g., resistor 320) of one gauge (e.g., gauge 318) positioned in the tension region 304 and the another resistor (e.g., resistor 322) of the same gauge positioned in the compression region 308, a radial strain (indicated by curve 402) may show positive strain change (tension) and negative strain change (compression) associated with the port or diaphragm (e.g., diaphragm 302) in relation to the resistors 320 and 322. A tangential strain (indicated by curve 404) is also shown.

Some applications using sensing devices may have harsh environments. For example, some automotive, HVOR, industrial, and/or aerospace applications may implement sensing devices in hydraulic systems where there is a potential liquid hammer effect. The term "liquid hammer" or "fluid hammer" may refer to an increase in pressure within a very short time period caused by a moving liquid or fluid that abruptly stops or changes direction. Such systems may require relatively high proof pressure (e.g., maximum pressure to maintain device performance) ability for sensing devices and may introduce challenges for micro silicon strain gauge configurations (e.g., as shown in FIG. 3), where part of a gauge (e.g., gauge 318) and/or corresponding glass bond may lie in a tension region (e.g., tension region 304). A typical liquid hammer pressure spike effect may range from few kilo-bars/second to several hundred kilo-bars/second. For example, under high pressure or while experiencing a liquid hammer effect, the glass bond may crack or the gauge may be damaged. Such damage may start from the tension region as the glass may be a brittle material and may be weak under a maximum principle tension strain. Further, micro silicon strain gauges may be implemented with stainless steel ports (e.g., port 300) that may undergo a phase change in a center region (e.g., center region 310) and/or tension region (e.g., tension region 304) of the port, which may cause unwanted retained austenite (e.g., residual or retained austenite of a quenching process which did not convert martensite) to convert to martensite. Conversion to martensite may occur when a corresponding sensing device is implemented in cold weather (e.g., in the winter) where typical temperatures may be 0 degrees Celsius to −40 degrees Celsius.

This is issue may cause about 0.5~4.0 parts per million of the retained austenite/martensite issue, which may become a quality issue, particularly for applications in the automotive industry. These issues may cause a sensor signal drift and lead to a safety issue in the application of the corresponding sensing device. Additionally, a thermal or temperature gradient may form on the gauge (e.g., gauge 312 and/or 318), which may be caused in part by a rectangular shape of the gauge along a diameter (the dashed line referenced by arrow 330) of the port. Temperature gradients may typically form from the outer diameter to the inner diameter or from the inner diameter to the outer diameter. In other words, the temperature gradients discussed herein may be radial temperature gradients. Typical rectangular strain gauges may have a long radial footprint which may result in a high temperature gradient on the gauge (e.g., high delta temperature between a first resistance leg and a second resistance leg or between two resistors on a rectangular strain gauge). Temperature gradients may cause an overshoot error for the sensed pressure (e.g., the pressure sensor may wrongly indicate a pressure applied), particularly during a temperature gradient test of the sensing device (e.g., an ice tank test to simulate a vehicle entering a cold water lake or pond). As will be discussed below, L-shaped strain gauges may have perpendicular legs, which may result in a smaller radial footprint having a smaller temperature gradient over the gauge.

The techniques and features described in the present disclosure may be implemented to improve performance of sensing devices and address one or more of the issues described above. For example, an L-shaped gauge may have two resistors positioned adjacent to each other orthogonally, or oriented 90 degrees from each other, and may be positioned in a compression region of a port. In other words, the entire gauge (whether L-shaped or not) may be positioned in the compression region of the port. Because the compression regions of the port may be further away from the center of the port (e.g., due to the nature of a deformed thin diaphragm), the thermal gradient may be reduced as the resistors may be located relatively close to each other and at a similar radial location. For example, if an L-shaped gauge is used, one leg of the gauge having one resistor thereon may sense a radial/compressional (negative) strain change in the compression region, and the other leg of the gauge having the other resistor thereon may sense a tangential (relatively positive) strain change in the radial compression region, while providing relatively high sensitivity (e.g., as part of a Wheatstone bridge configuration).

Figure 5:
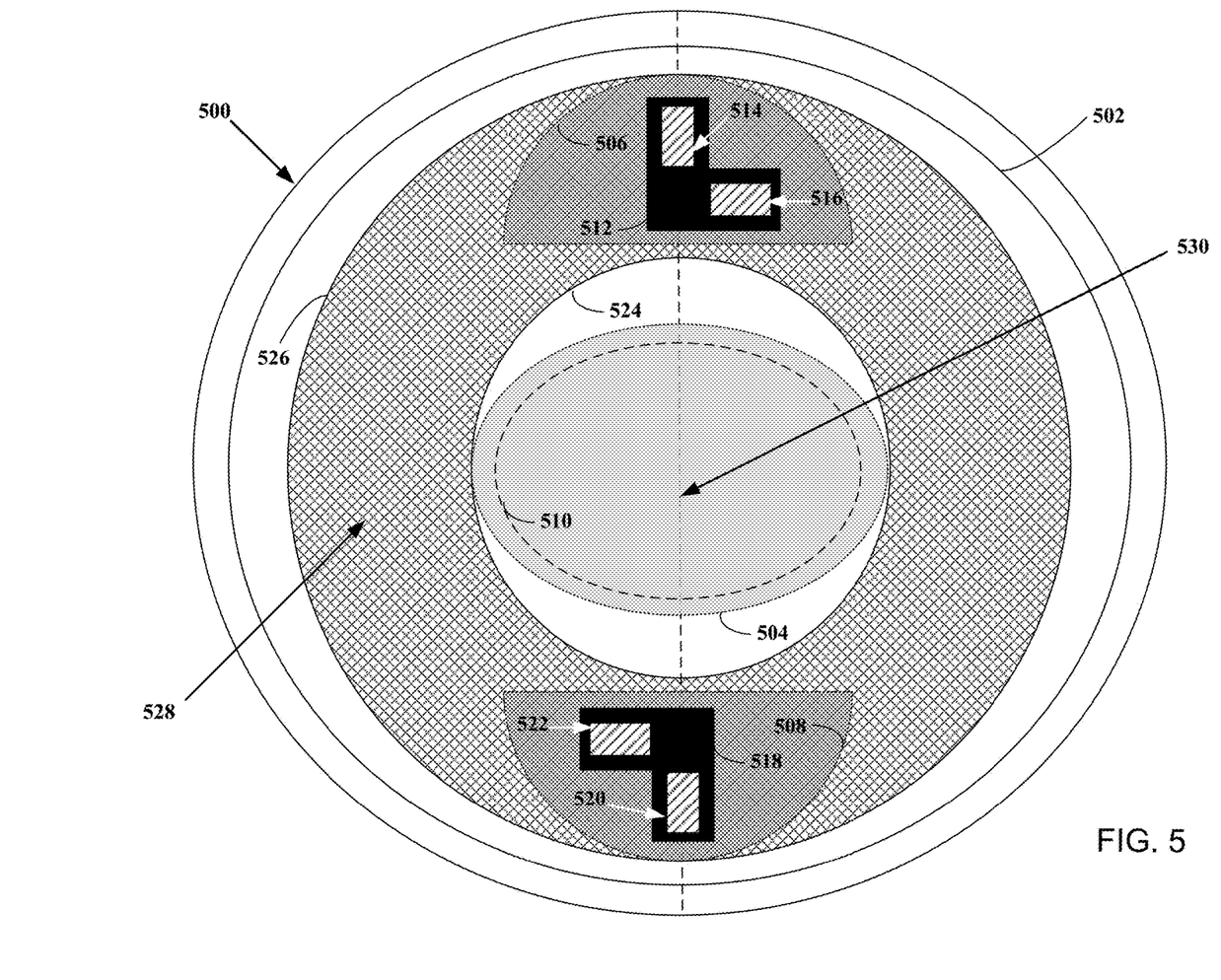
FIG. 5 illustrates an example port and gauge configuration for a sensing device in accordance with embodiments the present disclosure.

Referring to FIG. 5, a sensing device may be a pressure or force sensor that includes a stainless steel port or body (e.g., port 500) and one or more micro silicon strain gauges (e.g., gauges 512 and/or 518). For example, in some embodiments, a first gauge (e.g., gauge 512 and/or 518) may be positioned on a port (e.g., port 500) of the sensing device. The micro silicon strain gauges 512 and/or 518 may include sense elements, which may include one or more resistors (e.g., resistors 514, 516, 520, and/or 522). The port 500 or body may maintain fluidic communication between an interior channel and a fluid medium or may sustain an applied force. As fluid from the fluid medium enters and fills the interior channel of the port 500, pressure from the fluid may cause a diaphragm (e.g., diaphragm 502) to flex, or an applied force may cause the steel port or body to elastically deform. The pressure or applied force may, at least in part, cause a tension region or zone (e.g., tension region 504) and a compression region or zone (e.g., compression regions 506 and/or 508) to develop on the diaphragm 502 of the port. A compression region area 528 (cross-filled for ease of view) may represent an area between circle 524 and circle 526 where the compression regions 506 and/or 508 may develop when the port 500 (or body) experiences pressure (or applied force). In other words, the compression region area 528 may represent space on the port 300 (or body) where the port (or body) may experience a radial strain having a negative value.

In some embodiments, a first resistor (e.g., resistor 514) of the first gauge (e.g., gauge 512) may be positioned in a first compression region (e.g., compression region 506) of the port 500. Further, in some embodiments a second resistor (e.g., resistor 516) of the gauge 512 may be positioned in the compression region 506 of the port 500. The port 500 may be glass bonded to the gauge 512. The pressure or applied force may cause a change in the diaphragm 502 which may, for example, cause the resistor 514 in the compression region 506 to shorten or compress in a radial direction (e.g., along the dashed line referenced by arrow 530), which may result in a decrease in resistance of the resistor 514, while the other resistor 516 may also be compressed in the radial direction but may be elongated in a tangential direction (i.e., positive strain), which may result in a resistance increase in the resistor 516. The resistors 514 and 516 may be implemented as part of a Wheatstone bridge configuration which may detect or capture a resistance change and output a corresponding voltage proportional to the pressure or applied force.

In some embodiments, the resistor 514 may be positioned approximately orthogonal to the resistor 516. In other words, the resistor 514 may be positioned at an approximate right angle or approximately 90+/−10 degrees (e.g., 80-100 degrees) relative to the resistor 516. The gauge 512 may be substantially L-shaped. In other words, the original length of the resistor 514 and the resistor 516 may or may not be equal and the angle between the resistor 514 and the resistor 516 may be in range of 80 to 100 degrees. The gauge 512 may be a first L-shaped gauge. The resistor 514 may be positioned on a first leg of the first L-shaped gauge (e.g., gauge 512). The resistor 516 may be positioned on a second leg of the first L-shaped gauge (e.g., gauge 512). The gauge 512 may be positioned outside of the center region 510 of the port 500. The gauge 512 may also be positioned outside of the tension region 504 of the port 500.

In some embodiments, a second gauge (e.g., gauge 518) may be positioned on the port 500 of the sensing device. A third resistor (e.g., resistor 520) of gauge 518 may be positioned in a second compression region (e.g., compression region 508) of the port 500. Further, a fourth resistor (e.g., resistor 522) of the gauge 518 may be positioned in the compression region 508 of the port 500. The port 500 may be glass bonded to the gauge 518.

The pressure or applied force may cause a change in the diaphragm 502 which may, for example, cause the resistor 520 in the compression region 508 to shorten or compress in a radial direction (e.g., along the dashed line referenced by arrow 530), which may result in a decrease in resistance of the resistor 520, while the other resistor 522 may also be compressed in radial direction but may be elongated in a tangential direction (e.g., positive strain), resulting in a resistance increase in the resistor 522. The resistors 520 and 522 may be implemented as part of a Wheatstone bridge configuration which may detect or capture a resistance change and output a corresponding voltage proportional to the pressure or applied force.

In some embodiments, the resistor 520 may be positioned approximately orthogonal to the resistor 522. In other words, the resistor 520 may be positioned at an approximate right angle or approximately 90+/−10 degrees (e.g., 80-100 degrees) relative to the resistor 522. The gauge 518 may be substantially L-shaped. In other words, the original length of the resistor 520 and the resistor 522 may or may not be equal, and the angle between the resistor 520 and the resistor 522 may be in range of 80 to 100 degrees. The gauge 518 may be a second L-shaped gauge. The resistor 520 may be positioned on a third leg of the second L-shaped gauge (e.g., gauge 518). The resistor 522 may be positioned on a fourth leg of the second L-shaped gauge (e.g., gauge 518). The gauge 518 may be positioned outside of the center region 510 of the port 500. The gauge 518 may also be positioned outside of the tension region 504 of the port 500. It should be noted that while the port 500 shows two L-shaped gauges, this is for illustrative purposes only and more L-shaped gauges may be implemented. For example, in some embodiments, four L-shaped gauges may be implemented on the port 500 (or body).

Figure 6:
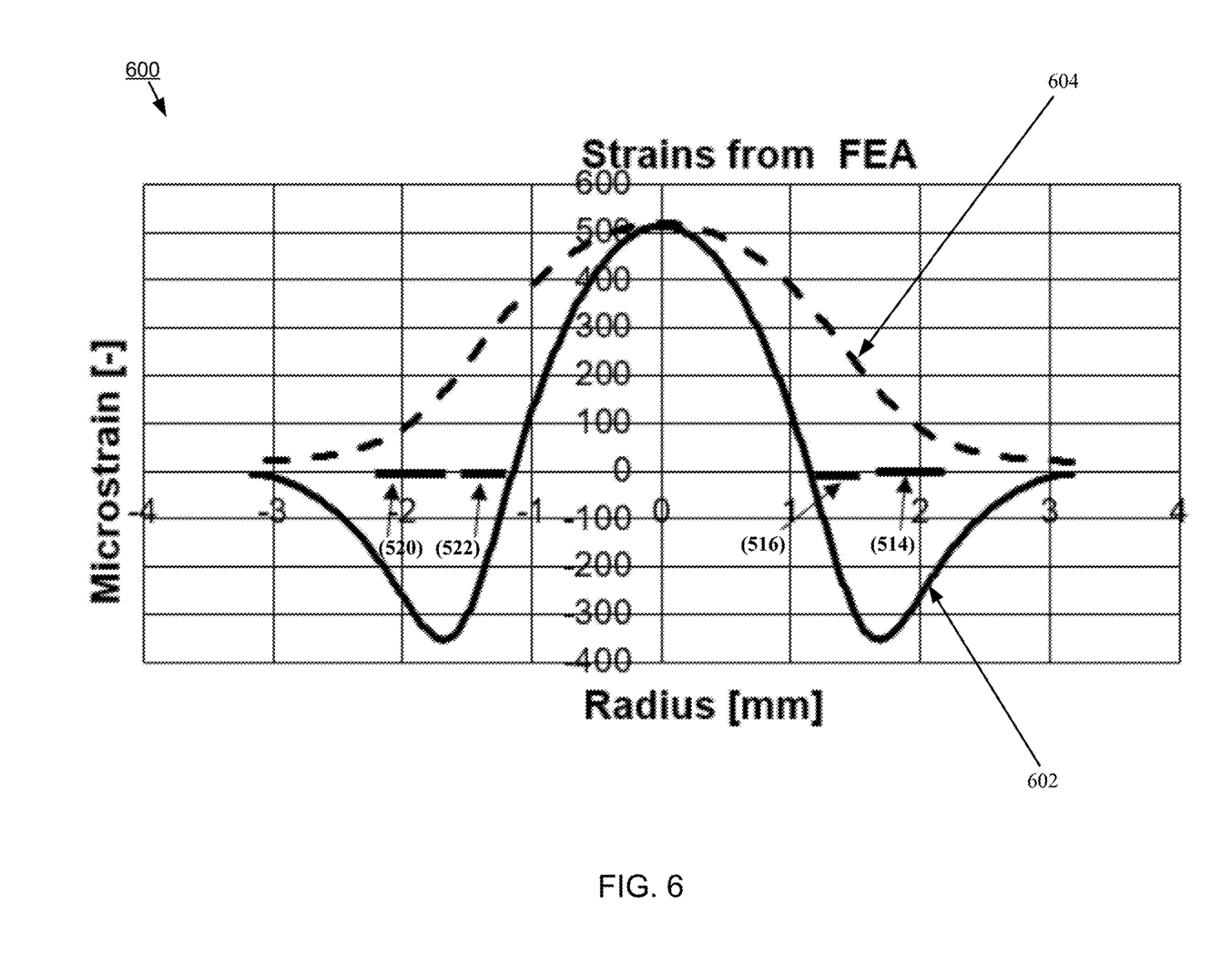
FIG. 6 shows a graph illustrating example strains measured using the port and gauge configuration of FIG. 4.

Referring to FIG. 6 a graph 600 illustrating example strains measured using the gauge configuration of FIG. 5 is shown. For example, with the gauge 512 (e.g., an L-shaped gauge) positioned in the compression region 506 and resistors 514 and 516 thus also positioned in the compression region 506, a radial strain (indicated by curve 602) and a tangential strain (indicated by curve 604) may show positive radial strain change (tension) and negative radial strain change (compression) associated with the diaphragm 502 in relation to the resistors 514 and 516.

Using L-shaped gauges (e.g., as shown in FIG. 5) instead of, for example, rectangular shaped gauges (e.g., as shown in FIG. 3 and described above), or otherwise positioning the gauges and/or resistors outside of the tension region and/or within one or more compression regions, may allow for increased space between the gauges (e.g., from about +/−1.2 mm to about +/−1.6 mm). Such a configuration may reduce tensile stress/strains on the glass (e.g., glass bond) by about 70% and may improve a liquid hammer survivability of the sensing device. The design safety factor calculated using Mohr-Coulomb criteria may indicate about 3×-4× of safety factor improvement for the configuration shown in FIG. 5 as compared to the configuration shown in FIG. 3 (i.e., with the same pressure applied). If the same design safety factor is kept, a proof pressure or force of the sensing device may be improved by 3×-4×.

Further, using L-shaped gauges (or otherwise positioning gauges and/or resistors in the compression regions) may allow for the gauges to be positioned further from a center region (e.g., center region 510) of the port 500, which may reduce or eliminate a phase change effect that may occur in the center region. Thus, as retained austenite (which may render the stainless steel weaker and more breakable) may develop or convert to martensite in the center region of the port due to the phase change, using L-shaped gauges (or otherwise positioning gauges and/or resistors in the compression regions) outside the center region may reduce or eliminate the signal drift caused by retained austenite/martensite.

Additionally, using gauge configurations that allow the resistors of the gauge to be positioned in the compression region, outside the tension region, and/or outside the center region, or otherwise using gauges with a smaller footprint (e.g., as shown in FIG. 5) than rectangular shaped gauges (e.g., as shown in FIG. 3) may significantly reduce thermal or temperature gradients that may develop along gauges. Such configurations may improve accuracy of corresponding sensing devices (e.g., as may be detected during a temperature gradient test) and reduce a pressure or force overshoot of the sensing device (caused at least in part by the thermal or temperature gradient) by about 70%.

It should be noted that while some gauges are described in the present disclosure as being L-shaped and some resistors are described in the present disclosure as being orthogonal to, at a right angle from, or about 90 degrees (e.g., 80-100 degrees) from each other, this is not intended to limit the scope of the present disclosure and other configurations and positions of gauges and resistors are within the scope of the present disclosure. For example, using gauge configurations that allow all the resistors to be positioned in the radial strain compression region, outside the tension region, and/or outside the center region, or otherwise using gauges with a smaller footprint (e.g., as shown in FIG. 5) than rectangular shaped gauges (e.g., as shown in FIG. 3) may provide the benefits described herein, whether or not the gauges are L-shaped or the resistors are positioned orthogonal to, at a right angle from, or 90 degrees from each other.

Figure 7:
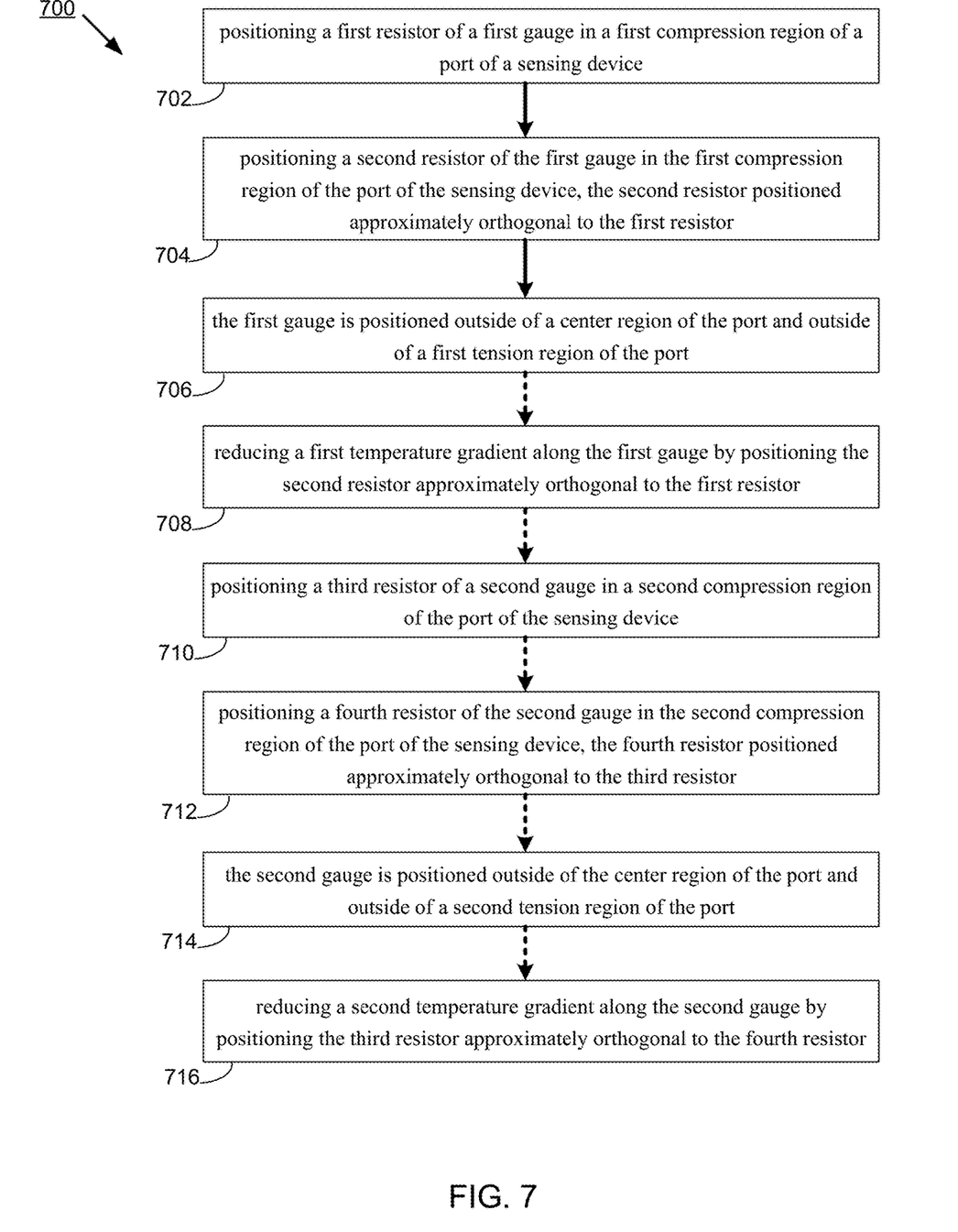
FIG. 7 illustrates a flowchart showing example operations in accordance with embodiments of the present disclosure.

Referring to FIG. 7, a method 700 (e.g., for implementing various techniques and features of the present disclosure) is shown. In some embodiments, the method may include positioning (702) a first resistor (e.g., resistor 514) of a first gauge (e.g., gauge 512) in a first (e.g., radial strain) compression region (e.g., compression region 506) of a port (e.g., 500) of a sensing device. The method may further include positioning (704) a second resistor (e.g., resistor 516) of the first gauge (e.g., gauge 506) in the first compression region (e.g., compression region 506) of the port (e.g., port 500) of the sensing device. The second resistor (e.g., resistor 516) may be positioned approximately orthogonal to the first resistor (e.g., resistor 514). The first gauge (e.g., gauge 512) may be positioned (706) outside of a center region (e.g., center region 510) of the port (e.g., port 500) and outside of a (radial strain) tension region (e.g., tension region 504) of the port.

Some or all of the following features may be included. The method may include reducing (708) a first temperature gradient along the first gauge (e.g., gauge 512) by positioning the second resistor (e.g., resistor 516) approximately orthogonal to the first resistor at a similar radial distance from the center (e.g., resistor 514). The method may further include positioning (710) a third resistor (e.g., resistor 522) of a second gauge (e.g., gauge 518) in a second (e.g., radial strain) compression region (e.g., compression region 508) of the port (e.g., port 500) of the sensing device. The method may also include positioning (712) a fourth resistor (e.g., resistor 520) of the second gauge (e.g., gauge 518) in the second compression region (e.g., compression region 508) of the port (e.g., port 500) of the sensing device. The fourth resistor (e.g., resistor 520) may be positioned approximately orthogonal to the third resistor (e.g., resistor 522). The second gauge (e.g., gauge 518) may be positioned (714) outside of a center region (e.g., center region 510) of the port (e.g., port 500) and outside of a tension region (e.g., tension region 504) of the port. Additionally, the method may include reducing (716) a second temperature gradient along the second gauge (e.g., gauge 518) by positioning the third resistor (e.g., resistor 522) approximately orthogonal to the fourth resistor at a similar radial distance from the center (e.g., resistor 520).

Embodiments of the present disclosure may provide improved gauge balance (e.g., may lower gauge unbalance) in conditions where retained austenite converts to martensite in the center region of the port (e.g., in cold weather conditions). Gauge unbalance may refer to a resistance change/difference between two resistors within one gauge. Once retained austenite is converted to martensite, a volume change may affect the resistor on top of (or close to) that area, which may cause the resistance of the resistor to change and result sensor signal drift. By positioning the gauge further from the center region of the port, a significant reduction in gauge unbalance caused by retained austenite may be realized. Further as discussed above, by positioning gauges/resistors away from the center region and/or the tension region and in one or more compression regions of the port, embodiments of the present disclosure may reduce tensile stress, may improve a liquid hammer survivability of the sensing device, and may improve a proof pressure or force of the sensing device. Additionally, using gauge configurations that allow the resistors of the gauge to be positioned in the compression region, outside the tension region, and/or outside the center region of the port, or otherwise using gauges with a smaller footprint (e.g., L-shaped gauges) than rectangular shaped gauges, may significantly reduce thermal or temperature gradients that may develop along the gauges, improve accuracy of a corresponding sensing device, and reduce a pressure or force overshoot of the sensing device.

It should be noted that the techniques herein are well suited for use in any type of sensor application such as pressure sensing devices as discussed herein. However, it should also be noted that embodiments herein are not limited to use in such applications and that the techniques discussed herein are well suited for other applications as well.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph (f) for any limitations of any of the claims herein, except for those in which the claim expressly uses the words 'means for' or 'step for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A sensing device, comprising:
  a first gauge positioned on a port of the sensing device, wherein the first gauge is a first L-shaped gauge including sense elements which further include a first resistor and a second resistor;
  the first resistor positioned on a first leg of the first L-shaped gauge, the first resistor positioned away from a center region and a tension region and in a first compression region of the port; and
  the second resistor positioned on a second leg of the first L-shaped gauge, the second resistor positioned away from the center region and the tension region and in the first compression region of the port.

2. The sensing device of claim 1, wherein the first resistor is positioned approximately orthogonal to the second resistor.

3. The sensing device of claim 1, wherein the first gauge is positioned outside of at least one of:
  the center region of the port; and
  the tension region of the port.

4. The sensing device of claim 1, wherein the first resistor and the second resistor are part of a Wheatstone bridge configuration.

5. The sensing device of claim 1, wherein the port is a stainless steel port that is glass bonded to the first gauge and a glass bond corresponding to the first gauge is positioned outside of the center region of the port.

6. The sensing device of claim 1, wherein the first compression region is a region that indicates a negative radial strain under an applied pressure or an applied force.

7. The sensing device of claim 1, further comprising:
  a second gauge positioned on the port of the sensing device;
  a third resistor of the second gauge, the third resistor positioned in a second compression region of the port; and
  a fourth resistor of the second gauge, the fourth resistor positioned in the second compression region of the port.

8. The sensing device of claim 7, wherein the second gauge is a second L-shaped gauge and the third resistor is positioned on a third leg of the second L-shaped gauge and the fourth resistor is positioned on a fourth leg of the second L-shaped gauge.

9. The sensing device of claim 7, wherein the second gauge is positioned outside of at least one of:
the center region of the port; and
the tension region of the port.

10. The sensing device of claim 7, wherein at least one of the first compression region and the second compression region is a radial strain compression region.

11. The sensing device of claim 7, further comprising:
a third gauge and a fourth gauge,
wherein the first, second, third, and fourth gauges are substantially L-shaped.

12. A method comprising:
positioning a first resistor of a first gauge away from a center region and a tension region and in a first compression region of a port of a sensing device, wherein the first gauge is a first L-shaped gauge including sense elements which further include the first resistor positioned on a first leg of the first L-shaped gauge and a second resistor positioned on a second leg of the first L-shaped gauge; and
positioning a second resistor of the first L-shaped gauge away from the center region and the tension region and in the first compression region of the port of the sensing device, the second resistor positioned approximately orthogonal to the first resistor,
wherein the first L-shaped gauge is positioned outside of the center region of the port and outside of the tension region of the port.

13. The method of claim 12, further comprising:
reducing a first temperature gradient along the first gauge by positioning the second resistor approximately orthogonal to the first resistor.

14. The method of claim 12, further comprising:
positioning a third resistor of a second gauge in a second compression region of the port of the sensing device; and
positioning a fourth resistor of the second gauge in the second compression region of the port of the sensing device, the fourth resistor positioned approximately orthogonal to the third resistor,
wherein the second gauge is positioned outside of the center region of the port and outside of the tension region of the port.

15. The method of claim 14, wherein at least one of the first compression region and the second compression region is a radial strain compression region and the tension region is a radial strain tension region.

16. The method of claim 12, further comprising:
reducing a second temperature gradient along the second gauge by positioning the third resistor approximately orthogonal to the fourth resistor.

17. A sensing device, comprising:
a first L-shaped gauge positioned on a port of the sensing device, wherein the first L-shaped gauge includes sense elements which further include a first resistor and a second resistor;
the first resistor positioned on a first leg of the first L-shaped gauge, the first resistor positioned away from a center region and a tension region and in a first radial strain compression region of the port;
the second resistor positioned on a second leg of the first L-shaped gauge, the second resistor positioned away from the center region and the tension region and in the first radial strain compression region of the port;
a second L-shaped gauge positioned on the port of the sensing device, wherein the second L-shaped gauge includes sense elements which further include a third resistor and a fourth resistor;
the third resistor positioned on a third leg of the second L-shaped gauge, the third resistor positioned away from the center region and the tension region and in a second radial strain compression region of the port; and
the fourth resistor positioned on a fourth leg of the second L-shaped gauge, the fourth resistor positioned away from the center region and the tension region and in the second radial strain compression region of the port.

18. The sensing device of claim 17, wherein the first L-shaped gauge and the second L-shaped gauge are positioned outside of at least one of:
the center region of the port; and
the tension region of the port.

* * * * *